United States Patent

Fukunaga

[11] Patent Number: 5,845,054
[45] Date of Patent: Dec. 1, 1998

[54] METHOD AND APPARATUS FOR DETERMINING A CORRECTION PATTERN OF PERIODICAL UNEVENNESS OF AN APPARATUS IN WHICH OPTICAL BEAMS ARE REFLECTED BY A ROTATING POLYGONAL MIRROR AND SCAN A RECORDING BODY

[75] Inventor: Fumihiko Fukunaga, Hino, Japan

[73] Assignee: Konica Corporation, Tokyo, Japan

[21] Appl. No.: 681,920

[22] Filed: Jul. 29, 1996

[30] Foreign Application Priority Data

Aug. 8, 1995 [JP] Japan .................................. 7-202382

[51] Int. Cl.$^6$ .................................................. H04N 1/40
[52] U.S. Cl. ......................... 395/107; 358/494; 347/261
[58] Field of Search ..................... 358/481, 494, 358/461, 296, 300, 302; 359/216–219; 395/107; 347/259–261

[56] References Cited

U.S. PATENT DOCUMENTS

| 5,032,928 | 7/1991 | Sakai et al. | 358/448 |
| 5,204,759 | 4/1993 | Sakai et al. | 358/444 |
| 5,371,608 | 12/1994 | Muto et al. | 358/412 |

FOREIGN PATENT DOCUMENTS

| 2-131956 | 5/1990 | Japan . |
| 2-237267 | 9/1990 | Japan . |
| 4-75702 | 12/1992 | Japan . |

Primary Examiner—David K. Moore
Assistant Examiner—Stephen Brinich
Attorney, Agent, or Firm—Frishauf, Holtz, Goodman, Langer & Chick

[57] ABSTRACT

An apparatus for forming an image corresponding to an input image signal, includes a light beam generator for generating a light beam; a driver for driving the light beam generator; and an image outputting device for scanning the generated light beam which has been reflected by a rotary polygonal mirror to a recording medium in a primary direction and, for moving the recording medium in a secondary direction substantially perpendicular to the primary direction so that the image is formed. A periodical modulation signal generator changes a phase or an amplitude of a first reference signal including a fundamental frequency having a period corresponding to one rotation of the rotary polygonal mirror, and generates a plurality of periodical modulation signals having different phases or different amplitudes from each other. A multiplier multiplies a second reference signal having a predetermined frequency value by the plurality of periodical modulation signals respectively. A controller controls the driver and the image outputting device in accordance with a plurality of multiplied periodical signals, and forms images respectively corresponding to the plurality of multiplied periodical signals. A periodical modulation signal inputting device inputs a first periodical modulation signal corresponding to a first position on the recording medium, and a second periodical modulation signal corresponding to a second position different from the first position. A calculator generates an unevenness correction signal in response to the inputted first and second periodical modulation signals.

7 Claims, 2 Drawing Sheets

METHOD AND APPARATUS FOR DETERMINING A CORRECTION PATTERN OF PERIODICAL UNEVENNESS OF AN APPARATUS IN WHICH OPTICAL BEAMS ARE REFLECTED BY A ROTATING POLYGONAL MIRROR AND SCAN A RECORDING BODY

BACKGROUND OF THE INVENTION

The present invention relates to a method for determining a correction pattern of a periodical unevenness of an apparatus in which light beams are reflected by a rotational polygonal mirror and scan a recording body, and to an apparatus in which light beams are reflected by a rotational polygonal mirror and scan a recording body. The present invention is a technology which can be applied to an image forming apparatus in which light beams are reflected by a rotating polygonal mirror and scan a recording body.

Conventionally, some methods are widely known to reduce influences due to unevenness, (for example, density unevenness which appears on output images in the case of an image forming apparatus), of an apparatus in which light beams are reflected by a rotating polygonal mirror and scan a recording body. The first method uses a highly accurate rotating polygonal mirror in which a tilt of a mirror surface or fluctuations of a reflection factor on the mirror surface are small. The second method corresponds to the respective factors which cause density unevenness. For example, in order to correct the influence due to a tilt of the mirror surface by which density unevenness is caused, an image forming apparatus in which an input image signal is modulated corresponding to intervals between scanning lines which are changed by a tilt of the mirror surface, has been disclosed in Japanese Patent Publication Open to Public Inspection No. 131956/1990 (hereinafter referred to as Japanese Patent O.P.I Publication). Further, in order to reduce the influence caused by fluctuations of reflection factors of the mirror surface, an image forming apparatus in which the reflection factor, which is changed by the rotation angle of the rotating polygonal mirror, is calculated, and an input image signal is modulated corresponding to the calculated reflection factor, has been disclosed in Japanese Patent O.P.I Publication No. 75702/1992. The third method is to modulate an input image signal by using a plurality of periodical modulation patterns, in which a single rotation of the rotating polygonal mirror is used as one period, and to select a pattern by which unevenness is reduced, to modulate an input image signal by using the pattern as a periodical unevenness correction pattern, as disclosed in Japanese Patent O.P.I Publication No. 237267/1990.

The conventional first method requires an expensive rotating polygonal mirror. In the conventional second method, because there are various causes for the generation of unevenness, and all of the unevenness is not corrected even when only one of the causes for the unevenness is corrected, plural corrections are necessary. Further, in many cases, the relationship between the causes of unevenness and the unevenness is nonlinear, and therefore, complicated calculations are necessary. Plural corrections are necessary, and thereby, various measurements are required. Still further, when the causal relation between the cause of unevenness and the unevenness is not clear, this method can not be applied for that purpose.

Relating the above description, the conventional third method can reduce the influence of unevenness even if a comparatively inexpensive rotating polygonal mirror is used. However, several problems occur as follows: when there are many periodical modulation patterns to be selected, the selection operation tends to be complicated, and when there are few patterns, sometimes the influence of unevenness can not be reduced.

Further, there are many cases where the grade of the influence of unevenness is different in the primary scanning direction, and the conventional third method can not cope with such cases, which is a problem.

Further, even when the influence of unevenness due to the rotating polygonal mirror is removed, there is a problem in that the density unevenness remains in the primary scanning direction.

This unevenness is caused by the conveyance direction in the developing unit and the optical system. Accordingly, as far as the structure of these units in the apparatus is not changed, the density unevenness in the primary scanning direction occurs in the same way as described above.

SUMMARY OF THE INVENTION

The first object of the present invention is to provide a method for determining a periodical density unevenness pattern of an apparatus by which light beams are reflected by a rotating polygonal mirror and a recording body is scanned thereby, in order to reduce the influence of unevenness even when a comparatively inexpensive rotating polygonal mirror is used, wherein the method can satisfactorily reduce the influence of unevenness even though the selection operation for the periodical modulation patterns is simple.

The second object of the present invention is to provide an apparatus in which light beams are reflected by the rotating polygonal mirror and the recording body is scanned thereby, wherein the apparatus can satisfactorily reduce the influence of unevenness even when the grade of influence due to unevenness is different in the primary scanning direction.

The third object of the present invention is to provide an apparatus by which the influence of density unevenness in the primary scanning direction can be reduced, and in which light beams are reflected by the rotating polygonal mirror and the recording body is scanned thereby.

The above objects of the present invention can be attained by the following embodiments.

The first embodiment

A method for determining a periodical density unevenness correction pattern in which an input image signal is modulated by a periodical density unevenness correction pattern in which a single rotation of a rotating polygonal mirror corresponds to one period; light beams, the intensity of which is modulated by the modulated input image signal, are reflected using the rotating polygonal mirror and a recording body is scanned thereby; the periodical density unevenness correction pattern for an apparatus by which the recording body is subsidiarily scanned when the recording body is moved relative to the light beam in the direction almost perpendicular to the primary scanning direction, is determined; the method for determining a periodical density unevenness correction pattern characterized in that: the input signal is modulated by a periodical modulation pattern in which the phase of a basic periodical modulation pattern, one period of which corresponds to a single rotation of the rotating polygonal mirror, is changed, and the modulated input signal is outputted; a phase having small unevenness is selected; then, the input signal is modulated by the periodical modulation pattern in which an amplitude of the periodical modulation pattern of the selected phase is changed, and the modulated input signal is outputted; and an amplitude having a small unevenness is selected, and the periodical density unevenness correction pattern is determined.

The second embodiment

The method for determining a periodical density unevenness correction pattern according to embodiment 1, wherein the apparatus comprises:

a light beam generation means for generating the light beams;

a rotating polygonal mirror which reflects the light beams so that the light beams primarily scan the recording body;

a relative movement means for relatively moving the recording body in the direction almost perpendicular to the primary scanning direction of the light beam;

a pattern generation means for generating the periodical density unevenness correction pattern;

a modulation means for modulating an input image signal by the periodical density unevenness correction pattern; and a driving means for controlling the light beam generation means by the input image signal modulated by the modulation means and a synchronous signal which is synchronized with the rotation of the rotating polygonal mirror, and for modulating the intensity of the light beam.

The third embodiment

An apparatus in which an input image signal is modulated by a periodical density unevenness correction pattern in which a single rotation of a rotating polygonal mirror corresponds to one period; light beams, the intensity of which is modulated by the modulated input image signal, are reflected using the rotating polygonal mirror and a recording body is scanned thereby; and the recording body is subsidiarily scanned when the recording body is moved relative to the light beam in the direction almost perpendicular to the primary scanning direction; the apparatus characterized in that the periodical density unevenness correction pattern is a pattern in which the amplitude of the periodical modulation pattern is modulated in the primary scanning direction.

The fourth embodiment

The apparatus according to the third embodiment, wherein the apparatus comprises:

a light beam generation means for generating the light beams;

a rotating polygonal mirror which reflects the light beams so that the light beams primarily scan the recording body;

a relative movement means for relatively moving the recording body in the direction almost perpendicular to the primary scanning direction of the light beam;

a pattern generation means for generating the periodical density unevenness correction pattern;

a modulation means for modulating an input image signal by the periodical density unevenness correction pattern; and a driving means for controlling the light beam generation means by the input image signal modulated by the modulation means and a synchronous signal which is synchronized with the rotation of the rotating polygonal mirror, and for modulating the intensity of the light beam.

The fifth embodiment

An apparatus in which an input image signal is modulated by a periodical density unevenness correction pattern in which a single rotation of a rotating polygonal mirror corresponds to one period; light beams, the intensity of which is modulated by the modulated input image signal, are reflected by the rotating polygonal mirror and a recording body is scanned thereby; and the recording body is subsidiarily scanned when the recording body is moved relative to the light beam in the direction almost perpendicular to the primary scanning direction, the apparatus characterized in that an input image signal is modulated by the periodical density unevenness correction pattern, and further, by a density modulation pattern which is different in the primary scanning direction.

The sixth embodiment

The apparatus according to the fifth embodiment, wherein the apparatus comprises:

a light beam generation means for generating the light beams;

a rotating polygonal mirror which reflects the light beams so as to primarily scan the recording body;

a relative movement means for relatively moving the recording body in the direction almost perpendicular to the primary scanning direction of the light beam;

a pattern generation means for generating the periodical density unevenness correction pattern and the density modulation pattern;

a modulation means for modulating an input image signal by the periodical density unevenness correction pattern and the density modulation pattern; and a driving means for controlling the light beam generation means by the in put image signal modulated by the modulation means and a synchronous signal which is synchronized with the rotation of the rotating polygonal mirror, and for modulating the intensity of the light beams.

Light beams mean the narrowed luminous flux. Laser beams are preferably used for the light beams. The periodical density unevenness correction pattern is a periodical pattern in which a single rotation of the rotating polygonal mirror corresponds to one period, and which corrects the density unevenness. The periodical modulation pattern is a periodical pattern in which a single rotation of the rotating polygonal mirror corresponds to one period. The basic periodical modulation pattern is predetermined in the apparatus. The periodical modulation pattern preferably includes a sinusoidal wave, in which a single rotation of the rotating polygonal mirror corresponds to one period, as a primary component.

The periodical modulation pattern including a sinusoidal wave, in which a single rotation of the rotating polygonal mirror corresponds to one period, as a primary component, means the following.

$$f_{(x)} = 1 + \sum_{n=1}^{\infty} a_n \cos nx + \sum_{n=1}^{\infty} b_n \sin nx \qquad \text{[Equation 1]}$$

When the periodical modulation pattern f(x) is developed to a Fourier series, Fourier coefficients $a_n$ and $b_n$ satisfy the following equation with respect to the natural number n not less than 2.

$$a_n^2 + b_n^2 \leq (a_1^2 + b_1^2)/3$$

In this case, the following equations are preferably satisfied.

$$a_n^2 + b_n^2 \leq (a_1^2 + b_1^2)/(n^2 - 1) \quad 2 \leq n \leq 5$$

$$a_n^2+b_n^2 \leq (a_1^2+b_1^2)/25 \quad n \geq 6$$

Further, the following equation is preferably satisfied.

$$a_n^2+b_n^2 \leq (a_1^2+b_1^2)/(n^2-1) \quad 2 \leq n \leq 10$$

$$a_n^2+b_n^2 \leq (a_1^2+b_1^2)/100 \quad n \geq 11$$

These Fourier coefficients can be measured by the frequency analysis.

The description in which the amplitude of the periodical modulation pattern is modulated in the primary scanning direction, is similar to that the amplitude modulation pattern in which one primary scanning corresponds to one period, is multiplied by the periodical modulation pattern f(x).

The unevenness having the spatial frequency within the range of 0.5 mm to 2 mm, easily becomes conspicuous, and when the spatial frequency is out of this range, the unevenness becomes inconspicuous. For example, a problem arises when the pitch of the subsidiary scanning is 80 μm, and an 8-surface rotating polygonal mirror is used, the unevenness during one rotation is generated per 640 μm period. This unevenness is within the conspicuous range.

The unevenness in rotation is also caused by the mounting error of the polygonal mirror other than by its processing error. The unevenness is also caused by dislocation between the mirror shaft and the drive shaft.

The unevenness is also generated by the common multiple of a period of one rotation of the rotating polygonal mirror. The unevenness at 2 and 3 times of a period, respectively occur at every 320 μm and 160 μm, which are out of the conspicuous range. Accordingly, a sinusoidal wave having one component of the above periods, that is, a sinusoidal wave in which a single rotation of the rotating polygonal mirror corresponds to one period, is preferable.

The apparatus in the present invention includes an image forming apparatus in which light beams are reflected by the rotating polygonal mirror and scans the recording body. The recording body includes photosensitive films, photosensitive printing plates, and electrophotographic photoreceptors.

DETAILED DESCRIPTION OF THE PREFERRED EMBODIMENT

EXAMPLE 1

[Apparatus]

Figure 1:
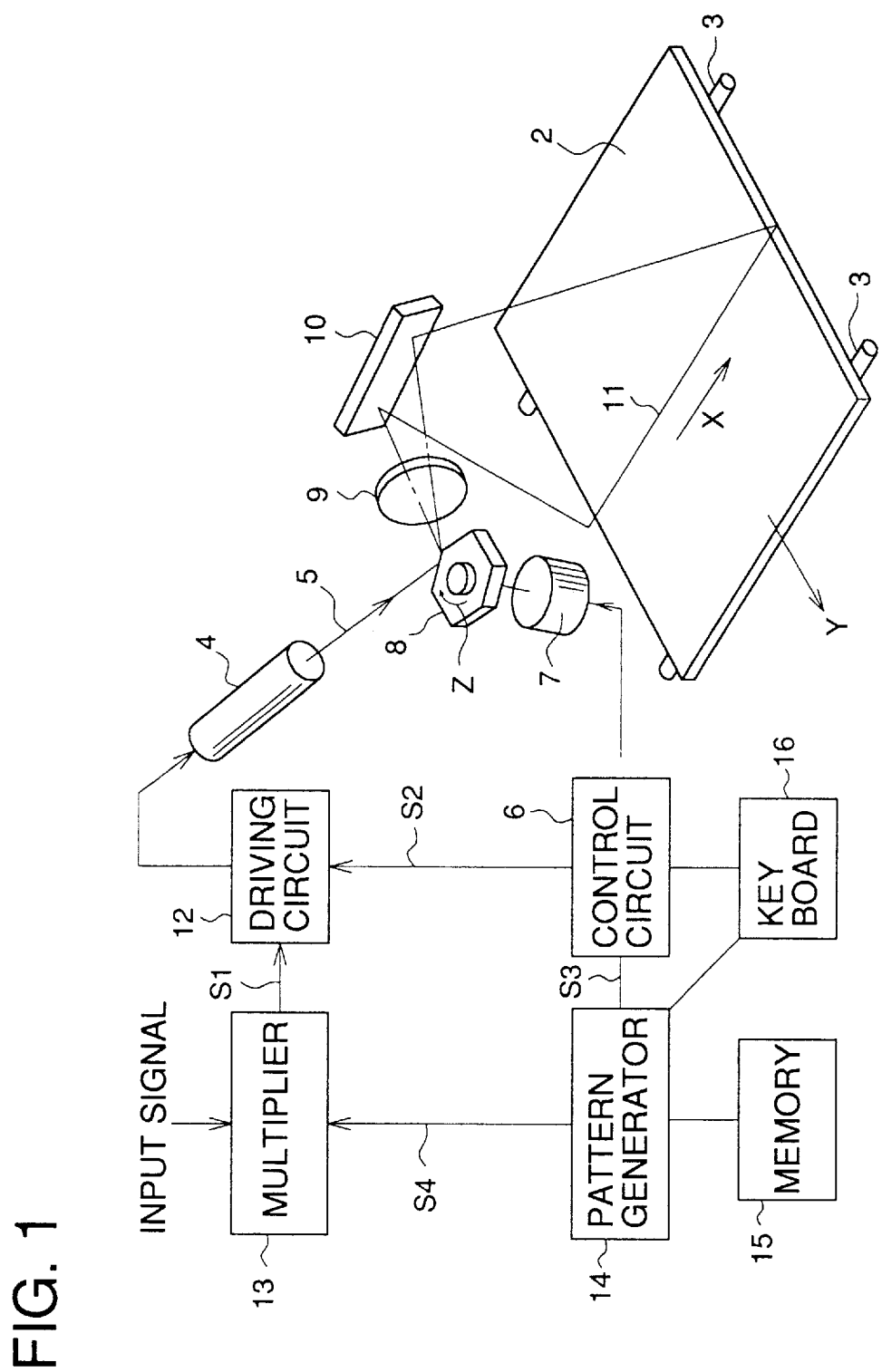
FIG. 1 is a perspective view showing the general structure of an image recording apparatus in Example 1.

FIG. 1 is a perspective view showing the outline structure of an example of an image recording apparatus using a rotating polygonal mirror.

A sheet of film 2 of silver halide photographic photosensitive materials for image recording, which is a recording body in the present invention, is set at a predetermined position of an image recording apparatus 1. The film 2, set at the predetermined position, is conveyed (subsidiarily scanned) in the arrowed direction Y by a film conveyance means 3 driven by a driving means, not shown in the drawing. A laser beam 5 is reflected by a rotating polygonal mirror 8, rotating at high speed in the arrowed direction Z, which is driven by a motor 7 controlled by a motor control circuit 6. After the reflected laser beam has passed an fθ lens 9, the optical path of the beam is changed by a mirror 10, the beam enters into the film 2, and repeatedly primary-scans along a primary scanning line 11, extending in the arrowed direction X which is almost perpendicular to the subsidiary scanning direction (arrowed direction Y).

An image signal inputted into the image recording apparatus is multiplied by a signal S4, obtained by multiplying a periodical density unevenness correction pattern from a pattern generator 14 and a density modulation pattern, and then a corrected image signal S1 is obtained. A drive circuit 12 controls a semiconductor laser 4 so that the intensity of the laser beam is modulated in synchronization with the primary scanning, according to a primary scanning signal S2 outputted from the motor control circuit 6 and the corrected image signal S1. The motor control circuit 6 not only controls a motor 7, but also generates primary scanning signals S2 and S3. The pattern generator 14 is synchronized with the primary scanning according to the primary scanning signal S3, and is synchronized with the rotation of the rotating polygonal mirror 8. The pattern generator 14 reads the periodical density unevenness correction pattern and the density modulation pattern, stored in a memory 15, and these are multiplied by each other. A signal S4, obtained by multiplication of the periodical density unevenness correction pattern and the density modulation pattern, is sent to the multiplying unit 13. A key board 16 is connected to the pattern generator 14 as an input means from the operator which is used for determining the periodical density unevenness correction pattern and the density modulation pattern.

[A method for determining the periodical density unevenness correction pattern]

<A1>

Next, the method for determining the periodical density unevenness correction pattern will be described. The sinusoidal wave, in which a single rotation of the rotating polygonal mirror 8 corresponds to one period, is defined as a basic periodical modulation pattern g(x) shown by the following Equation (1).

[Equation 2]

$$g(x)=1+a_1 \sin x \qquad \text{Equation (1)}$$

$$h(x)=1+a_1 \sin (x+\delta) \qquad \text{Equation (2)}$$

The periodical modulation pattern h(x) shown by the above Equation (2) in which the phase of the basic periodical modulation pattern is shifted by δ, is generated by the pattern generator 14. The periodical modulation pattern signal is sent to the multiplying unit 13 instead of the signal in which the periodical density unevenness correction pattern and the density modulation pattern are multiplied as described in the above description of [Apparatus]. An image signal having a predetermined value is inputted as the image signal, and the image is recorded in the same manner as in the above-described [Apparatus], and then a test film is obtained.

In the first test film production, the periodical modulation pattern is generated by the pattern generator 14 by shifting the phase δ of the sinusoidal wave, with a predetermined amplitude $a_1$, of the basic periodical modulation pattern by predetermined angles (for example, 45°) per subsidiary scanning of the predetermined length.

Figure 2:
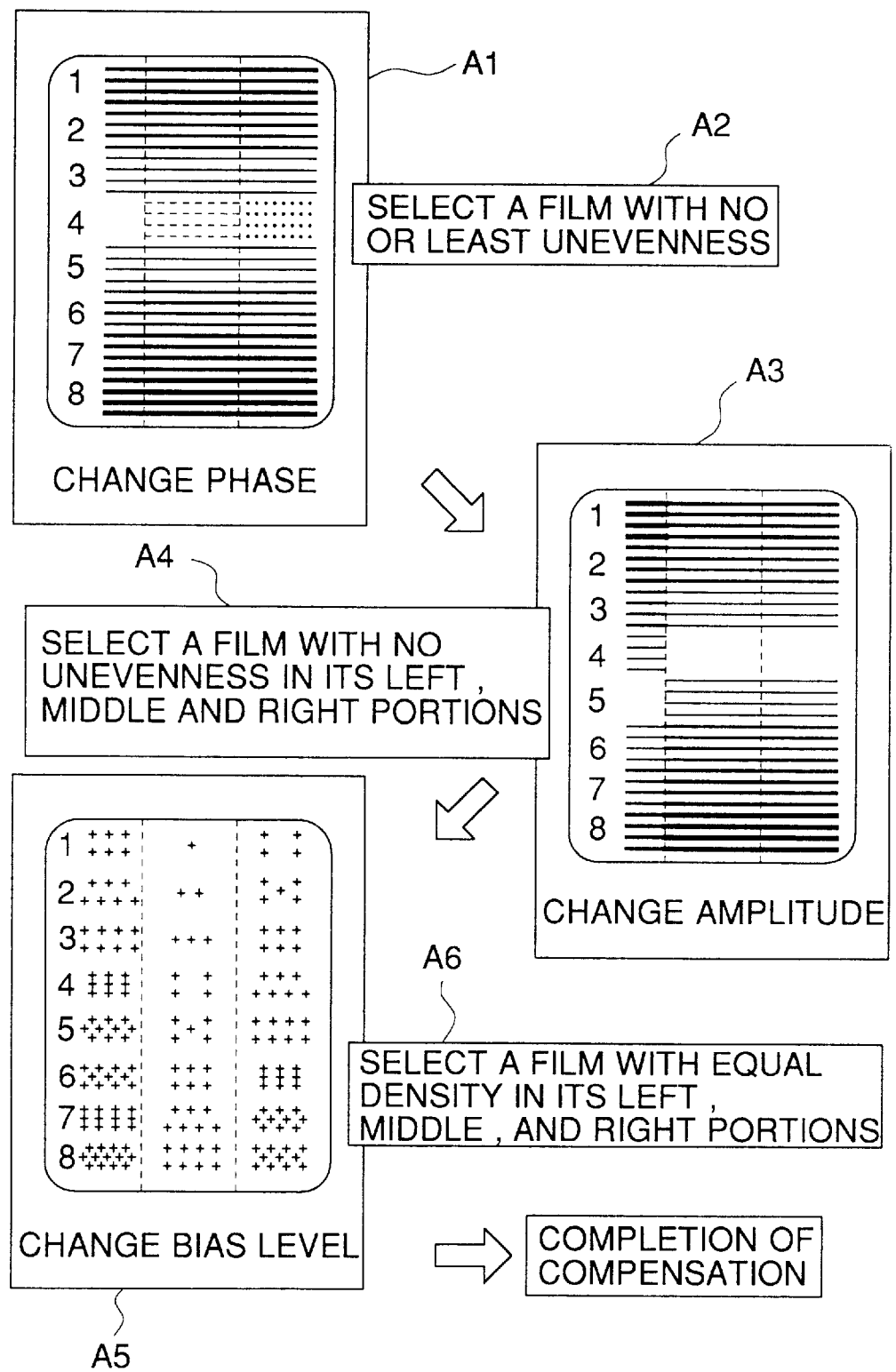
FIG. 2 is views showing a method for determining a periodical density unevenness correction pattern and a method for determining a bias pattern in examples.

For example, in a view shown by A1 in FIG. 2, a portion shown by numeral 1 written in the left side represents an image in which the phase is not changed, when the periodical modulation pattern is generated. A portion shown by numeral 2 is an image in which the phase is shifted by 45°.

Hereinafter, as the numeral is successively increased to 3, 4, . . . , the phase of the image is also successively shifted by 90°, 135°, . . .

Then, the operator carries out development processing of the test film, and selects a film having the least density unevenness. Then, the operator inputs the phase δ, at which the least density unevenness appears, from a key board 16. The pattern generator 14 stores the inputted phase δ in a memory 15.

For example, in a view shown by A1 in FIG. 2, density unevenness of an image shown by numeral 4, (that is, an image in which the phase is shifted by 135°), is the least in its left portion as compared with density unevenness of images shown by other numerals.

In the same manner, an image shown by numeral 4, (that is, an image in which the phase is shifted by 135°), has the least density unevenness in a middle portion of images, and an image shown by numeral 3, (that is, an image in which the phase is shifted by 90°), has the least density unevenness in a right portion of images, as compared with others.

When the operator inputs numerals "4, 4, 3", respectively corresponding to the left, middle, and right portions, from the key board 16, then, the pattern generator 14 stores respective inputted phases of the left, middle, and right portions in the memory 15.

<A3>

In the second test film production, the amplitude $a_1$ of the sinusoidal wave having the phase δ in the left, middle, and right portions, which is stored in the memory 15, is enlarged by a predetermined ratio (for example, 0.4%) from 0 for every predetermined length of the subsidiary scanning, and the pattern generator 14 generates a periodical modulation pattern.

For example, in a view shown by A3 in FIG. 2, a portion shown by numeral 1, written in the left side of the image, is an image in which the phase is shifted by 45° in the left and middle portions, and the phase is shifted by 135° in the right portion, when a periodical modulation pattern, the amplitude $a_1$ of which is 0, is generated. A portion shown by numeral 2 is an image having an amplitude a1 of 0.004 and the same phase as in numeral 1. Hereinafter, as the numeral is successively changed to 3, 4, . . . , only the amplitude is successively changed to 0.008, 0.012, . . .

<A4>

Then, the operator development-processes the test film, and the test film is divided into 3 equal portions of the left, middle and right in the primary scanning direction, and the least density unevenness portion is selected in the left, middle and right portions. After that, the amplitude having the least density unevenness in the left, middle and right portions, is inputted from the key board 16 by the operator. The pattern generator 14 stores the inputted amplitude "a" in the memory 15.

For example, in FIG. 2, a portion corresponding to the fifth amplitude in the left, and portions corresponding to the fourth amplitude in the middle and the right have the least density unevenness, therefore, the operator inputs "5, 4, 4" from the key board 16. Then, the pattern generator 14 respectively stores the amplitude in the left portion (the amplitude corresponding to 2% of the input signal: $a_1$=0.02), and the amplitude in the middle and right portions (the amplitude corresponding to 1.6% of the input signal: $a_1$=0.016) in the memory 15.

Next, the pattern generator 14 calculates correction parameters for each portion using the amplitude and the phase of each portion stored in the memory 15, and performs an interpolation operation of the correction parameter in the primary scanning direction by an interpolation operation program stored in the memory 15, and determines the correction pattern for each surface of the rotational polygonal mirror. Then, the pattern generator 14 calculates the periodical density unevenness correction patterns for each surface of the rotational polygonal mirror, and stores them in the memory 15. Thereby, generation of the density unevenness due to rapid variations of the amplitude of the correction signal can be prevented.

[A method for determining a density modulation pattern]

<A5>

Next, a method for determining a density modulation pattern is described. The density modulation pattern is determined after the periodical density unevenness correction pattern has been determined. In the test film production for determining the density modulation pattern, the test film is obtained as follows. The periodical density unevenness correction pattern is read from the pattern generator 14; a periodical density unevenness correction pattern signal, obtained when a bias level is lowered by a predetermined ratio (for example, 1%) for every predetermined length of the subsidiary scanning, is sent to the multiplying unit 13; the image signal having a predetermined value is inputted as the image signal; and an image is recorded in the same manner as in [Apparatus] described above.

<A6>

After that, the operator development-processes the test film, and the test film is divided into 3 equal portions of the left, middle and right in the primary scanning direction. A combination in which the density is most similar among the left, middle and right portions, is selected. The operator inputs values of the bias of the left, middle and right portions in the combination from the key board 16. The pattern generator 14 stores inputted values of the bias of those portions in the memory 15.

For example, in A5 in FIG. 2, an illustrative view of changes of density in each portion is shown. The number of "+" in A5 shows the relative density. In A5, a combination in which the density is most similar among the left, middle and right portions, is selected. In A5, the second portion of the left, the seventh portion of the middle, and the fourth portion of the right have respectively seven "+", therefore, the density of each portion is relatively similar. Accordingly, the operator inputs "2, 7, 4", respectively corresponding to the density in the left, middle, and right portions, from the key board 16. Then, the pattern generator 14 stores the inputted bias of the left portion (99%), the middle portion (94%) and the right portion (97%) in the memory 15.

Next, the pattern generator 14 performs the interpolation operation of the bias in the primary scanning direction by the interpolation operation program stored in the memory 15, and the density modulation pattern is determined. Then, it is stored in the memory 15.

In this connection, the density modulation pattern determined as above, and the periodical unevenness correction pattern stored in the memory 15 are multiplied for each data in the primary scanning position, and the result is stored. The stored pattern may be read out instead of the operation of [the periodical density unevenness correction pattern and the density modulation pattern stored in the memory 15 are read out and multiplied] in the description of [Apparatus].

There is a case where the phase is different in the direction of the scanning line, although it is not described in Examples. Also in such a case, the phase having the least density unevenness in each portion is selected, and correction parameters are determined in the same manner as in the method for determining the amplitude.

In this connection, it is preferable that the density of a test film outputted at determination of the periodical density unevenness correction pattern is normal contrast (for example, 0.6 to 2.0 D). This is from the reason that, in this density range, the unevenness is most visible in the visual characteristics and density characteristics of a recording medium.

The reason why the periodical density unevenness correction pattern is determined in the sequence from <A1> to <A4>, will be described below.

Advantages from [phase determination] to [amplitude determination]

In density unevenness correcting processes, a half solid image with uniform normal contrast density is outputted without correction, and generation of density unevenness on the image is checked. When there is no unevenness, the correcting sequence advances to the next process. When the image having the density unevenness is observed, no phase can be observed, however, amplitude of the density unevenness can be found to some degree. This image is compared with a sample density unevenness, and the amplitude is set. Then, the phase of the correction pattern is successively changed, and a half solid image is corrected and outputted. Then, when the image having the least unevenness is selected, the phase can be positively determined. Next, when the amplitude is minutely adjusted, the pattern which positively corrects the density unevenness, can be determined.

Disadvantages from [amplitude determination] to [phase determination]

In the case where the amplitude is successively changed so as to determine the amplitude before the phase determination, when the phase is shifted from the optimum value by 180°, the density unevenness is only emphasized and not reduced, so that the desired amplitude can not be obtained. Accordingly, it is necessary to determine the amplitude again after the phase has been determined in the second step, resulting in the lower efficiency.

Due to the first and the second embodiments described above, in order to reduce the influence of the unevenness using a comparatively inexpensive rotating polygonal mirror, the following is realized: selecting operations of the periodical modulation patterns can be simpler and the influence of the unevenness can be satisfactorily reduced.

Due to the third and the fourth embodiments, even when the grade of the influence of the unevenness is different in the primary scanning direction, the influence of the unevenness can satisfactorily be reduced.

Due to the fifth and the sixth embodiments, the unevenness due to a rotating polygonal mirror is reduced, and further, the influence of the unevenness of the density in the primary scanning direction can be reduced.

What is claimed is:

1. An image forming apparatus for forming an image corresponding to an input image signal, said apparatus comprising:

(a) light beam generation means for generating a light beam;

(b) drive means for driving said light beam generation means;

(c) image outputting means for scanning said light beam which has been reflected by a rotary polygonal mirror to a recording medium in a primary direction, and for moving said recording medium in a secondary direction which is substantially perpendicular to said primary direction;

(d) periodical modulation signal generation means for changing a phase or an amplitude of a first reference signal including a fundamental frequency having a period corresponding to one rotation of said rotary polygonal mirror, and for generating a plurality of periodical modulation signals having different phases or different amplitudes from each other;

(e) multiplying means for multiplying a second reference signal having a predetermined frequency value by said plurality of periodical modulation signals respectively, and thereby for generating a plurality of multiplied periodical signals;

(f) control means for controlling said drive means and said image outputting means in accordance with said plurality of multiplied periodical signals, and for forming images respectively corresponding to said plurality of multiplied periodical signals;

(g) periodical modulation signal inputting means for inputting a first periodical modulation signal which is one of said plurality of periodical modulation signals corresponding a first position on said recording medium, and a second periodical modulation signal which is one of said plurality of periodical modulation signals corresponding to a second position on said recording medium which is different from said first position on said recording medium; and (h) calculating means for generating an unevenness correction signal in response to said first and second periodical modulation signals inputted by said inputting means.

2. The image forming apparatus of claim 1, wherein control means controls said drive means and said image outputting means in response to said input image signal corrected by said unevenness correction signal so as to form an image corresponding to said input image signal corrected by said unevenness correction signal.

3. The image forming apparatus of claim 1 further comprising density modulation signal generation means for changing a bias level of said unevenness correction signal and for generating a plurality of density modulation signals having different bias levels from each other, and wherein said calculation means generates a plurality of density multiplying signals by multiplying said second reference signal by said plurality of density multiplying signals, and said control means controls said drive means and said image outputting means in response to said plurality of density multiplying signals so that images respectively corresponding to said plurality of density multiplying signal are formed.

4. The image forming apparatus of claim 3, wherein said inputting means inputs one of said plurality of density modulation signals, and said calculating means generates another unevenness correction signal by correcting said unevenness correction signal in response to one of said plurality of density modulation signals which is inputted.

5. The image forming apparatus of claim 3, wherein said control means controls said drive means and said image outputting means in response to said input image signal corrected by said another unevenness correction signal, and forms an image corresponding to said input image signal corrected by said another unevenness correction signal.

6. A method of forming an image corresponding to an input image signal by a light beam generation means for generating a light beam, a drive means for driving the light beam generation means, and an image outputting means for scanning said light beam which has been reflected by a rotary polygonal mirror to a recording medium in a primary direction and for moving said recording medium in a secondary direction which is substantially perpendicular to said primary direction so that said image is formed, the method comprising the steps of:

changing a phase or an amplitude of a first reference signal having a fundamental frequency in which one rotation of said polygonal mirror is one period;

generating a plurality of periodical modulation signals having different phases or different amplitudes from each other;

generating a plurality of periodical multiplying signals by multiplying a second reference signal having a predetermined value by said plurality of periodical modulation signals, respectively;

forming images onto said recording medium respectively corresponding to said plurality of periodical multiplying signals by controlling said drive means and said image outputting means corresponding to said plurality of periodical signals;

selecting a first periodical modulation signal which is one of said plurality of periodical modulation signals corresponding to a first position on said recording medium, and a second periodical modulation signal which is one of said plurality of periodical modulation signals corresponding to a second position on said recording medium which is different from said first position on said recording medium;

calculating a density unevenness correction signal in response to selected first and second periodical modulation signals;

controlling said drive means and said image outputting means in response to said input image signal corrected by said density unevenness correction signal; and forming said image in response to said input image signal corrected by said density unevenness correction signal.

7. A method of forming an image corresponding to an input image signal by a light beam generation means for generating a light beam, a drive means for driving said light beam generation means, and an image outputting means for scanning said light beam which has been reflected by a rotary polygonal mirror to a recording medium in a primary direction and for moving said recording medium in a secondary direction which is substantially perpendicular to said primary direction so that said image is formed, the method comprising the steps of:

changing a phase of a first reference signal having a fundamental frequency in which one rotation of said polygonal mirror is one period;

generating a plurality of first periodical modulation signals having different phases from each other;

generating a plurality of first periodical multiplying signals by multiplying a second reference signal having a predetermined value by said plurality of first periodical modulation signals, respectively;

forming images onto said recording medium respectively corresponding to said plurality of first periodical multiplying signals by controlling said drive means and said image outputting means corresponding to said plurality of first periodical multiplying signals;

selecting at least one of said phases of said first periodical modulation signals;

changing an amplitude of said first reference signal having said selected at least one of said phases;

generating a plurality of second periodical modulation signals having different amplitudes from each other;

generating a plurality of second periodical multiplying signals by multiplying said second reference signal by said plurality of second periodical modulation signals, respectively;

forming images onto said recording medium respectively corresponding to said plurality of second periodical multiplying signals by controlling said drive means and said image outputting means corresponding to said plurality of second periodical multiplying signals;

selecting at least one of said amplitudes of said second periodical modulation signals;

calculating a density unevenness correction signal in response to said selected at least one of said phases and said selected at least one of said amplitudes;

controlling said drive means and said image outputting means in response to said input image signal corrected by said density unevenness correction signal; and forming said image in response to said input image signal corrected by said density unevenness correction signal.

* * * * *